United States Patent

[11] 3,561,566

| | | | |
|---|---|---|---|
| [72] | Inventor | Werner Potrafke Hufeisenstrasse 16, 432 Hattingen, (Ruhr), Germany | |
| [21] | Appl. No. | 722,364 | |
| [22] | Filed | Apr. 18, 1968 | |
| [45] | Patented | Feb. 9, 1971 | |
| [32] | Priority | Apr. 20, 1967 | |
| [33] | | Germany | |
| [31] | | P 41946 | |

[54] ARRANGEMENT, ESPECIALLY FOR USE IN CONNECTION WITH THE CASHIER STAND, FOR SELF-SERVICE STORES AND THE LIKE
18 Claims, 19 Drawing Figs.

[52] U.S. Cl. .................................................. 186/1
[51] Int. Cl. .................................................. E04h 3/04
[50] Field of Search .................................... 186/1, 1.1, 1.1C; 198/(Inquired); 214/(Inquired)

[56] References Cited
FOREIGN PATENTS
678,844  1/1964  Canada ...................... 186/1

*Primary Examiner*—Harvey C. Hornsby
*Attorney*—Walter Becker

ABSTRACT: An installation for self-service stores according to which the goods purchased by a customer are moved by the latter to the cashier, checked off by the latter, and packed by the customer, which includes a plurality of, at least three, receiving containers for the goods, which between a loading station in manual reach of the cashier and one or more unloading stations are adjustable along tracks of which at least one section extends in a substantially vertical direction.

PATENTED FEB 9 1971
3,561,566
SHEET 1 OF 6
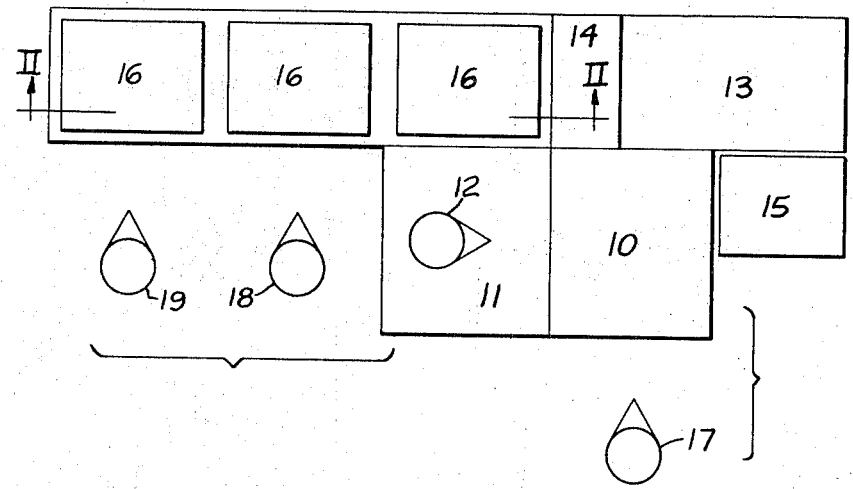
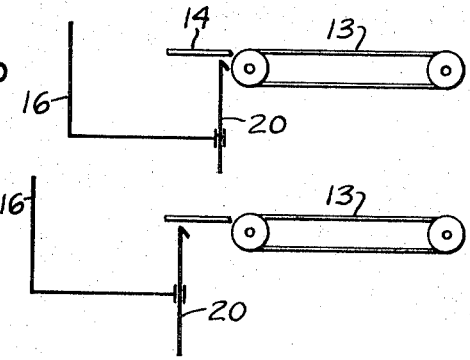
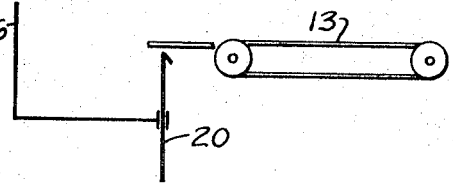
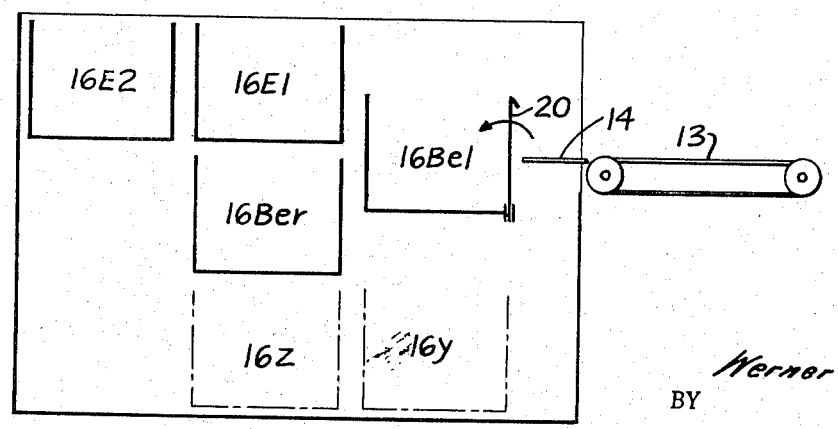
INVENTOR.
Werner Potrafke
BY

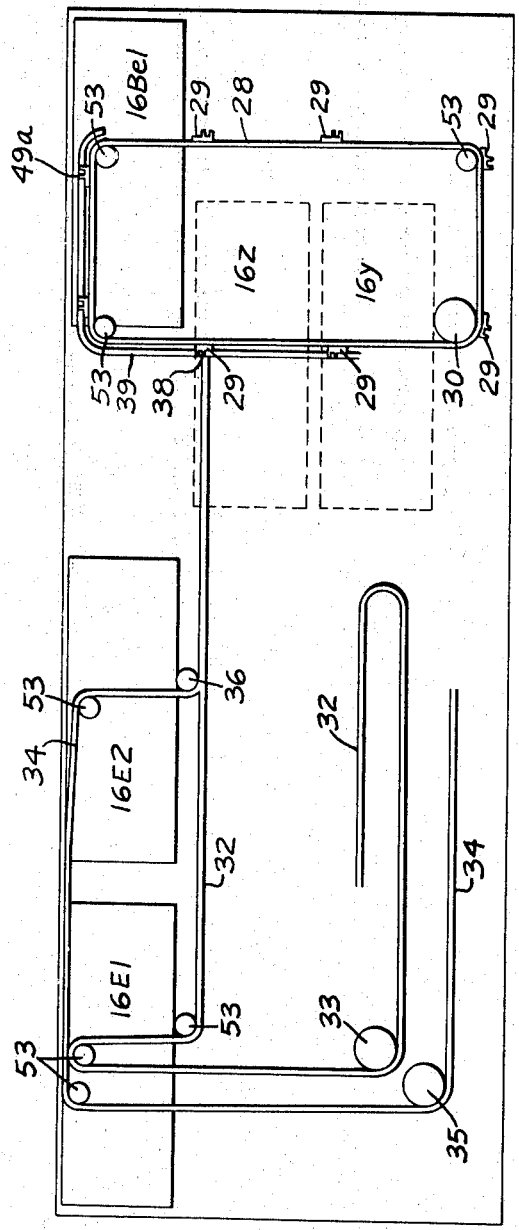
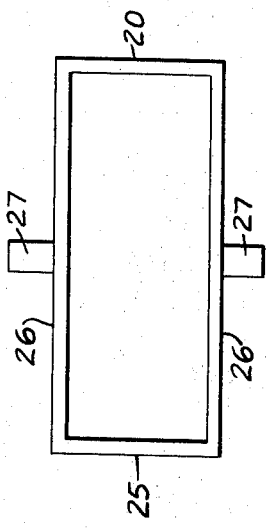

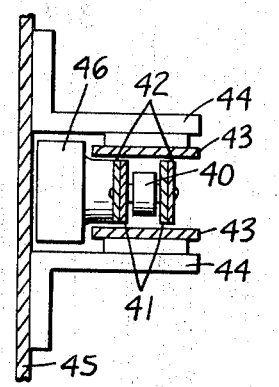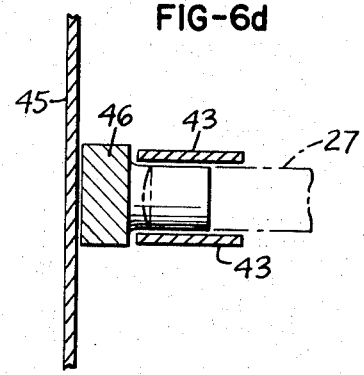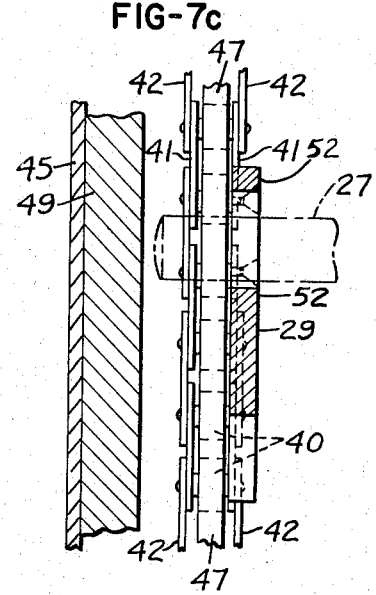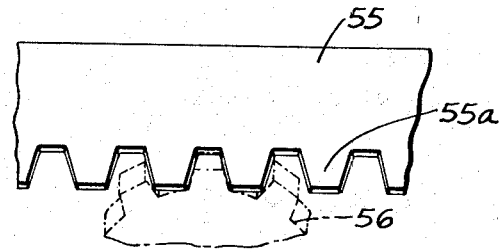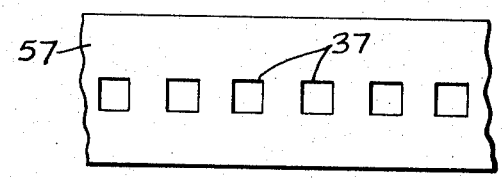

INVENTOR.
Werner Potrafke

BY 3,561,566

ARRANGEMENT, ESPECIALLY FOR USE IN CONNECTION WITH THE CASHIER STAND, FOR SELF-SERVICE STORES AND THE LIKE

The present invention relates to a device for self-service stores according to which the goods moved by the buyer in a basket or carriage are, by the cashier taken from one container and placed into another container while being checked off, and the customer is given the opportunity to pack the checked-off goods.

Cashier stations have become known according to which the customer with his basket or carriage containing the selected goods steps in front of the cashier station, and the cashier takes the goods individually out of said basket or carriage and places them in an adjacent basket or carriage while checking them off and entering the price into the cash register. After the payment for the goods, the customer leaves the cashier station with the now filled basket or carriage while the empty basket or carriage previously used by the customer will be available for the next customer.

On the other hand, cashier stations have been employed according to which the goods, by means of conveyor belts on which the goods have been placed by the cashier, pass from the cashier station to one or more packing stations, from which the customer withdraws the paid-for goods. For the mounting of the heretofore known cashier stations, a considerable ground surface is required. Moreover, the volume of the goods being bought is limited.

It is, therefore, an object of the present invention to considerably reduce the ground space required for checking off and packing the goods and also to reduce the required passages and the space in front and behind said passages which are necessary in a self-service store.

It is a further object of this invention to increase the quantity and the volume of the goods which can be checked off with a single purchase.

Still another object of this invention consists in seeing to it, that the articles which are in part fragile, will, during the handling by the cashier and during the transport from the cashier's station to the packing station, not be damaged, even if different articles are involved, such as bottles and articles of wood, metal, and ceramics, and small packages of pulverous substances, fruits and vegetables.

It is still another object of this invention so to design the cashier's station that the cashier will not have to carry out bodily fatiguing operations, and will be able, as far as possible, to handle his or her job from a sitting position while the customer will be able to pack the goods in standing-up position.

It is still another object of this invention so to design the cashier's station that the customer and the cashier will, during the checking off of the goods by the cashier, be only a slight distance from each other so that the customer can pay full attention to the checking-off operation and the checking-off operation and the payment for the goods can immediately be followed by the packing of the goods by the customer.

These and other objects and advantages of the invention will appear more clearly from the following specification, in connection with the accompanying drawings, in which:

FIG. 1 diagrammatically illustrates the plan view of a device according to the invention, comprising the cashier's station and the loading and unloading unit.

FIG. 2 is a side view of the device of FIG. 1 as seen along the section line II—II.

FIG. 2a and 2b are cutouts of FIG. 2 with different positions of the receiving container being moved toward the cashier.

FIGS. 3a, 3b, 3c, and 4d, represent diagrammatic illustrations of units comprising the cashier station and the loading and unloading units.

FIG. 4 is a side view similar to that of FIG. 2 of a somewhat modified device on a larger scale, and shows the tracks in the device with the driving means for displacing the receiving container.

FIG. 4a is a plan view of an individual container.

FIG. 5a is the side view of a section of a flat spring employed as pushing element.

FIG. 5b is a side view of a different embodiment of the flat spring.

Figure 6A:
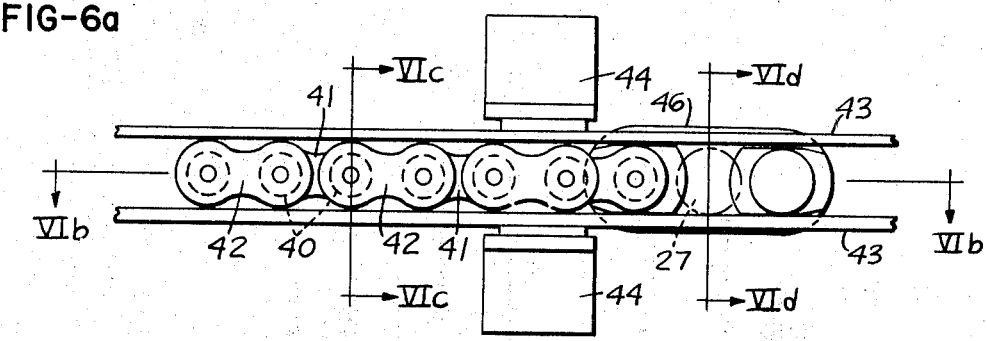

FIG. 6a is a side view of a roller chain with end follower.

Figure 6B:
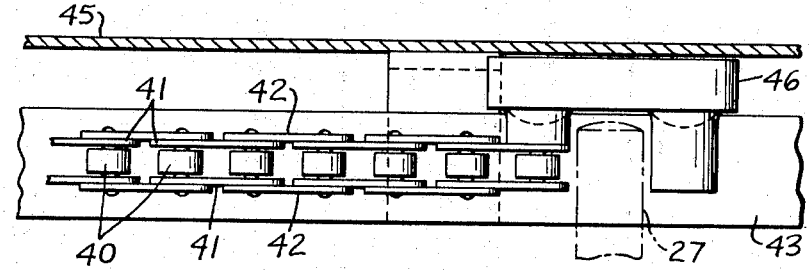

FIG. 6b is a horizontal section along the line VIb—VIb of FIG. 6a.

FIG. 6c is a vertical section taken along the line VIc—VIc of FIG. 6a.

FIG. 6d is a vertical section along the line VId—VId of FIG. 6a.

Figure 7A:
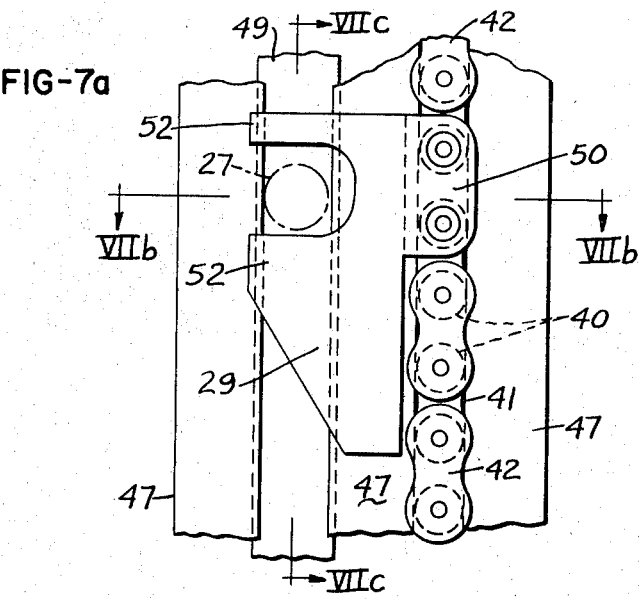

FIG. 7a is a side view of a modified roller chain with follower.

Figure 7B:
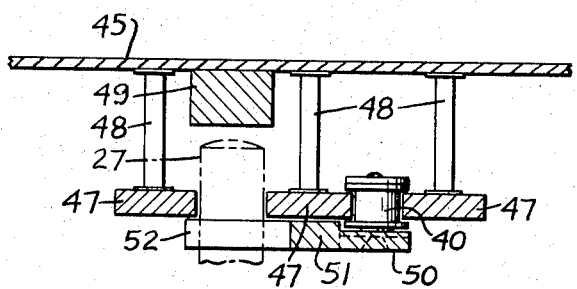

FIG. 7b is a vertical section along the line VIIb—VIIb of FIG. 7a.

FIG. 7c represents a vertical section along the line VIIc—VIIc of FIG. 7a.

The new element by means of which in conformity with the present invention the above-outlined objects have been realized consists in a special receiving container for the goods into which the cashier puts the goods while checking off the goods and entering the price thereof in the cash register. Between the loading station at which the container can well be served by the cashier in a sitting position, and one or more unloading stations as well as, if desired, one or more readiness positions, the receiving containers which are important for the device, and of which three or more are shown, are adjustable by movements of which at least a portion occurs in one direction containing a vertical component.

When the customer has been served by the cashier, and has paid for the goods, the cashier will allot a packing compartment to the customer, and will actuate the device in such a manner that the loaded container will move into one of the provided unloading stations. The unloading stations may be located directly adjacent the loading station, in which instance that space which is required with heretofore arrangements for packing chutes or for the arrangement of a tiltable conveyor belt or a conveyor belt with injectors will not be required. This will result in a considerable space saving realized by the present invention.

It is of importance so to design the device that in the unloading station the container will occupy a higher position than in the loading station. In the loading station the container should be at such a level that the cashier, who normally works while sitting down, will be able conveniently to carry out her work, in particular the withdrawal of the goods from the basket or cart and deposit of the goods into another container. The unloading station should be located so that the customer will be able in standing position easily to pack the goods. In this way the work to be carried out is adapted to the proper body position.

As has been mentioned above, the loading and unloading position or positions may follow each other directly. According to a basic design of the device according to the present invention, in conformity with which the receiving container has a substantially rectangular plan view which could also include a square-shaped plan view, the vertical projections of the container in loading and unloading position abut each other along a side of said rectangle. The plan view of the total loading and unloading unit which is determined by the tracks for the container has the shape of a preferably longitudinally stretched rectangle. The movements of the center of gravity of the container are located in a vertical plane which is parallel to one side of the rectangle while the container, when being moved from one position to the other position, will remain parallel to itself.

Whereas the unloading stations, if a plurality thereof is available, are expediently located on the same level and higher than the loading station, the readiness station, if such is provided, will be located below the unloading station so that a movement of the container will be possible from the readiness position to the unloading position without the necessity of having to move any of the containers which occupy their unloading position.

For purposes of moving the receiving containers from one position to another position, tracks may be provided along which the containers move on rails. While for the movement of the containers in tracks, which may be horizontal or vertical or at an incline, a power drive is provided, movements of the containers in downward direction may be carried out by taking advantage of gravity. In order to limit the speed of the downward movement, the vertical drop may be divided into inclined movements or braking devices may be provided.

If a customer has bought larger quantities of goods so that the receiving container will have a considerable length, the withdrawal of the goods from the receiving container and the placing of the goods into another container by the cashier would require greater physical efforts because the cashier would have to withdraw and deposit goods at the front as well as at the rear end of the container. In order to facilitate the handling of the goods for the cashier, according to the invention, an arrangement is provided according to which the container is movable stepwise or continuously relative to the position of the final loading, said movement taking place toward the oncoming customer in the horizontal direction. A plate for depositing of the goods by the customer may be provided. In this instance the cashier first moves the receiving container into a position in which the rear part of the container is easily accessible to her and during the withdrawing and depositing operation on the part of the cashier, the container is gradually moved backwards until it has reached its end position. It is advantageous to have the container in loading position located so high that its bottom is located lower but its upper edge is higher than the said plate from which the goods are withdrawn. In order to make it possible that the receiving container can move below the depositing plate, automatic means are provided which will be able to lower the transverse front wall of the container (when looking in advancing direction) in the intermediate position of the loading operation below the depositing plate.

It is to be assumed that the cashier will during the checking off operation operate the cash register with her right hand, whereas her left hand will withdraw the goods from one container and deposit them into another container. This operation will determine in which manner the cashier unit comprising the cash register carrier and the seat for the cashier on one hand and the loading and unloading unit on the other hand will be associated with each other with regard to space. This will be more fully explained in connection with the drawings further below.

In this connection an important advantage of the device according to the invention will be obtained, namely that in view of the various possibilities of placing the cash register unit and the loading and unloading units relative to each other, two of these structural members may be combined to pairs so that for each pair of such combined structures only one passage will be required for the customer for whom the checking off of the goods is carried out. This alone results in a considerable saving of space which in self-service stores has to be provided for the checking off of the goods and the packing of the checked-off goods by the customer. In self-service stores an economic use of the floor space is mandatory. In addition thereto, many self-service stores have a relatively considerable length in which the goods are displayed but leave relatively narrow space for the placing of the cashier's stand.

According to the present invention, those areas are not required which with heretofore known arrangements are necessary for the mounting of the conveyor belts by means of which the checked-off goods move from the cashier's stand to the individual packing cells or booths. Experience has shown that the new device reduces the area heretofore used for checking and depositing by about one-third.

As driving force for the movement of the receiving containers on the provided tracks, various devices may be employed. It has proved particularly advantageous to employ a drive according to which symmetrically to the longitudinal central plane the outer walls are equipped with a pair of bolts. Abutments or followers act upon said bolts in the direction of the desired acceleration, said abutments or followers being connected to elements which are designed either as pushing elements or as pushing and pulling elements. The pushing and pulling elements are flexible.

The length of the flexible pushing elements or pushing and pulling elements corresponds to the length of the pushing or pulling stroke plus a length which is required for the frictional engagement of a driving element along which the flexible elements are passed. The flexible elements are so designed that a frictional engagement between the same and the driving element is obtained.

For example a flexible element may be designed in the form of a flat spring and its rim may be designed in the manner of a rack. A pinion actuated by the drive motor may mesh with said rim.

According to another embodiment of the invention, a flat spring is over its entire length as far as it acts upon the driving element provided with a perforation. This perforation is then engaged by a pinion which is rotated by the driving member.

A preferred embodiment of a flexible pushing and pulling element is represented by a roller link chain which is guided in a fixed path over a plurality of rollers which serve as deviating wheels and of which at least one acts as driving wheel. The roller chain links are, as shown in the drawing, similar to the above-mentioned conveyor elements combined to pairs.

Referring now to the drawings in detail, the arrangement shown therein comprises a cash register 10 in front of which there is provided the seat 11 for the cashier. The cashier as a person is indicated by the circle 12. With all persons, the tip on the respective circle indicates the direction in which the person faces. A conveyor belt 13 conveys the goods to be checked off to a withdrawing station, in the illustrated embodiment represented by the depositing plate 14. The stack of the emptied baskets is designated with the reference numeral 15.

The receiving containers which represent a most important part of the present invention are generally designated with the reference numeral 16. FIG. 2 shows in solid lines the respective positions of the containers 16, whereas the dot-dash lines show intermediate positions of the receiving containers. The receiving container which occupies its receiving position is designated with the reference numeral 16B$el$ whereas the reference characters 16E1 and 16E2 designate the containers in their two unloading positions E1 and E2. The container in position for readiness is designated with the reference character 16B$er$.

It will be evident from the drawing that the container in its loading position is located lower than in its unloading position. In its loading position, the cashier 12 deposits the goods from the depositing plate 14 into the container which is in its loading position and does so while entering into the cash register the respective amounts for the goods bought by the customer 17 in front of her. The position or location of the container is so selected that the cashier can carry out her work while sitting down and can handle the goods with her left hand while operating the cash register with her right hand. After the customer has been served, the filled receiving container is on the tracks through positions 16y and 16z moved into one of the positions 16E1 or 16E2. In the position 16E1 the customer 18 will be able to empty the container and pack the goods. In the position 16E2, the customer 19 will be able to pack his goods.

If the customer 18 as well as the customer 19 have not completed packing their goods while the customer 17 at the cashier has been served and the goods of a new customer should now be entered into the cash register, the cashier is able to move the receiving container 16B$el$ to the position 16y and is thereupon able to move the container 16B$er$ which is in its readiness position on one of the provided tracks to the loading station so that she can start servicing the next customer. From the unloading positions 16E1 and 16E2, the containers can first be brought into the ready position and from there into the loading position.

As will be obvious from the above, only two loading stations, i.e. a total of four containers, are provided for such an operation. When relatively long containers are employed for receiving a larger volume of goods, the packing in the loading station by the cashier may, as mentioned above, be facilitated by the fact that the container is displaceable relative to the final loading position shown in FIG. 2 toward the depositing plate 14 in horizontal direction. In view of the fact that the upper edge of the container is located at a higher level than the depositing plate 14, it is necessary in order to permit such displaceability, that the front container wall 20, when looking in driving direction, can be lowered. Such lowering may be realized for instance by displacing the container downwardly against the thrust of vertical spring means.

FIGS. 2a and 2b respectively illustrate two positions of the receiving container to be loaded, according to which the container is partially moved below the depositing plate. At the start of the loading of the container, the cashier moves the container first into the position shown in FIG. 2b in which position the cashier is able without difficulties to fill the rear part of the container. In the course of the entering of the respective amounts for the goods into the cash register, the cashier can move the container backwards to approximately the position shown in FIG. 2a in which the intermediate part of the container is easily accessible to her. The front part of the container can thus easily be reached by the cashier with the container occupying the FIG. 2 position. As will be seen from FIGS. 2a and 2b, the front wall 20 of the container has been lowered to such an extent that the container bottom is partially below the level of the depositing plate 14.

With the above-described device, two unloading stations are provided which means two stations at which the customer can unload the containers filled with the goods and can pack his goods. The device has a total of four receiving containers.

Tests have shown that under some conditions, when employing the arrangement according to the invention, a second packing station is not necessary. In such instances a total of three receiving containers will suffice. The packing station E2 may be omitted and the tracks of the container may be designed correspondingly simpler. This modification of the device shown in FIG. 2 appears to be so evident that a special FIG. does not seem to be necessary.

FIGS. 3a, 3b, 3c and 3d respectively illustrate in plan view cutouts of a cashier's station for a larger self-service store. The arrows 21 designate the flow of oncoming customers proceeding to the cashier's station with the selected goods in a basket or a shopping cart. The arrows 31 designate the path along which the served customers who have paid for and packed their goods leave the store. Generally, for purposes of explanation it may be mentioned that in some instances the customer deposits the goods on a conveyor belt which then moves the goods to a plate from which the cashier removes the goods individually. In other instances, the cashier directly withdraws the goods from the basket or cart.

For purposes of a simple illustration of the various types of units, FIGS. 3a—3d do not illustrate such additional transporting device. The drawing merely shows the loading and unloading unit 22 which has a longitudinally extending rectangular plan view as shown in FIG. 1. The drawing furthermore shows the cashier's unit 23 formed by the cash register and the seat for the cashier. The way in which the cashier is seated is important for the cashier's unit. As has been mentioned above, the point on each circle indicates the direction in which the respective person faces. The reference numeral 24 indicates the passages through which the customers move. As indicated in FIGS. 1 and 2, the respective customer in front of the cashier is designated with the reference numeral 17 while the reference numeral 18 indicates the customer in front of the first packing station, and the reference numeral 19 indicates the customer in front of the second packing station. According to the arrangement of FIG. 3a, two loading and unloading stations 22 are arranged directly adjacent to each other and parallel to each other and pointing in the direction of flow of the goods. The two cashier units 23 are located on the outside of the loading and unloading units and parallel thereto but the cashiers face in opposite direction with regard to each other. Such unit is composed of two cashier units comprising cash register and seat for the cashier and two loading and unloading units each which include receiving containers and the tracks for moving the same.

In the customer's passage 24, the customers 17 face the cash register units in such a way that they do not interfere with each other. This is due to the fact that the oppositely located cash register units on opposite sides of a passage 24 are arranged in such a way that the cashiers look in opposite directions. The customer who has made his goods accessible to the cashier thus stands in the passage 24 and is here served by the cashier whereupon the customer moves to the respective packing station E1 or E2 (position 18 or 19) which packing station he is allotted by the cashier. The customer then empties his respective container 16, packs his goods and leaves the store in the direction of the arrow 31.

Figure 3A:
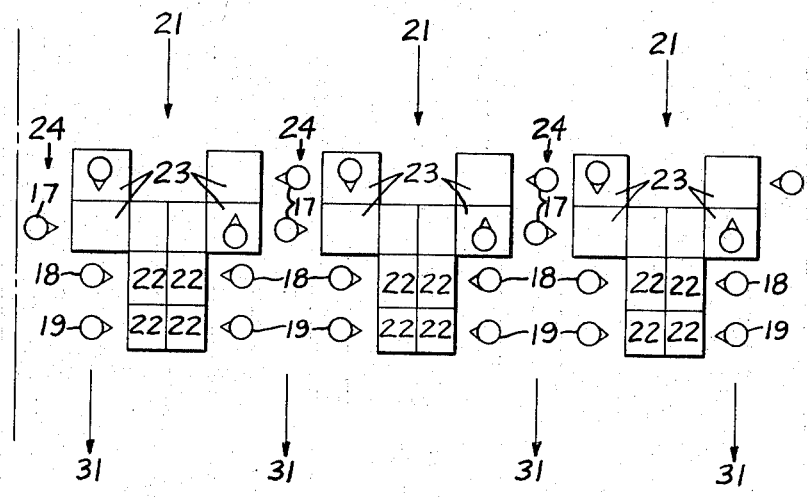
Figure 3B:
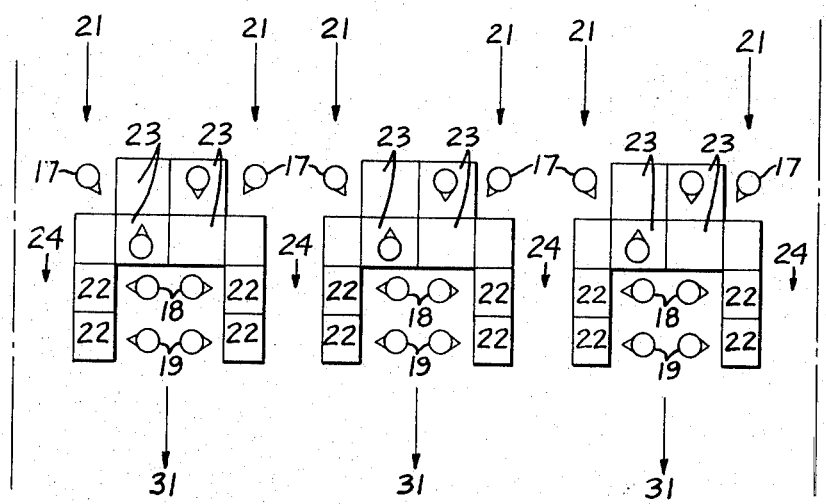
Figure 3C:
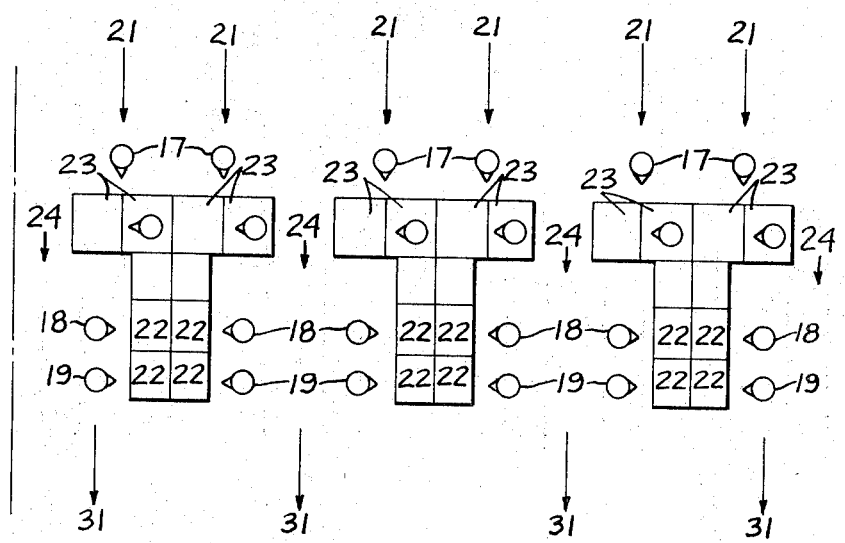
Figure 3D:
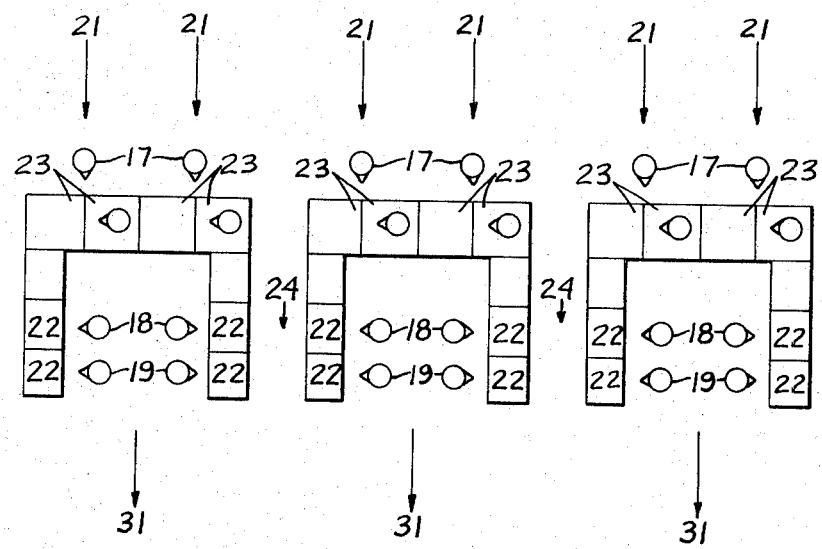

The units illustrated in FIGS. 3b—3d are similar to that shown in FIG. 3a inasmuch as two cash register units and two loading and unloading units are combined to one structural unit while a passage 24 is provided between the said two structural units for the customer.

According to the arrangement of FIG. 3b, the two cash register units 23 are arranged directly adjacent to each other but with the cashiers facing in opposite directions. Outside said cash register units 23 and parallel thereto there are provided a loading and unloading unit 22 each with the same direction of flow of the goods. During the checking off operation, the customers 17 occupy the position shown in FIG. 3b. In the inner space located between the two units 22, the customers 18 and 19 are in front of their respective packing stations. The course of the checking off and packing will be evident from the drawing.

According to the embodiment of FIG. 3c, the two cash register units 23 are arranged one behind the other with the cashiers looking in the same direction but transverse to the direction of the movement 21 of the customers. The two loading and unloading units 22 are arranged in the direction of movement of the customers and, more specifically, are arranged directly adjacent to each other. On the left-hand side of the cashier the two loading and unloading units 22 are directly adjacent to the cash register units 23.

The arrangement is such that on both sides of the centerline of the unit in the direction of the movement of the customers there is located one cash register unit 23 each and a loading and unloading unit 22. Between the two units there remains a passage 24 for the customers. During the checking off operation by the cashier, the customers will be in the position indicated by the reference numeral 17. The customers at the packing stations are again designated with the reference numerals 18 and 19. The course in which the customers are served is likewise evident from the drawing.

According to FIG. 3d, the arrangement of the cash register units 23 is the same as that of FIG. 3c. The difference consists in that the loading and unloading units 22 are not centrally located directly adjacent to each other but are spaced from each other. The spacing has to be such that between the two loading and unloading units 22 pertaining to one unit there will be sufficient space for the customer to reach the unloading stations so that the customer will be able in a proper manner to withdraw the goods from the receiving container and to pack the goods.

Also with this arrangement of the units, a passage 24 is provided between each two units. During the checking off, the customers are in the position indicated with the reference numeral 17 whereas during the packing of the goods, the customers are at 18 and 19 respectively. The checking procedure according to FIG. 3d should likewise be evident from the drawing.

FIG. 4 is a side view of a device according to the invention which not only illustrates the receiving containers in different positions but also illustrates the paths or tracks along which the receiving containers have to be moved. The reference numerals 16E1 and 16E2 designate two unloading positions for the container. Reference numeral 16Bel illustrates a container in loading position. Reference numerals 16z and 16y are intermediate positions occupied by the containers during their movement from the loading position to the unloading position and vice versa.

FIG. 4a shows a plan view of an individual container having a front wall 20, a rear wall 25 and two side walls 26. Centrally in the upper portion of the side walls there are provided bolts 27 by means of which the containers are transported. The transport of the containers is effected by pushing elements or by pushing and pulling elements provided with followers receiving the bolts or trunnions 27.

FIG. 5a is a side view of a flat spring 55 the lower margin of which is provided with teeth 55a. These teeth 55a are intended to mesh with a pinion 56 adapted to be driven by a motor. The flat springs which are arranged in pairs on both sides of the container are equipped with followers adapted to engage the bolts or trunnions 27.

FIG. 5b shows a modified pushing and pulling element in the form of a spring band 57. This band has perforations 37 for engagement by a pinion adapted to bring about a longitudinal movement of the band 57. Also such bands are provided in pairs. The band is likewise equipped with followers for engaging bolts or trunnions 27.

According to FIG. 4, driving means, preferably roller chains, are employed in such a way that three separate paths are provided, each path for one chain pair. The path 28 serves for lowering a container 16 from the loading position and to move another container into the loading position. To this end, there is provided a chain equipped with a row of followers 29. The chain passes over a driving wheel 30 and furthermore over a plurality of deviating rollers 53.

Furthermore, there is provided a separate path 32 on which the containers move from the unloading position E1 to the intermediate position 16z, and vice versa from the position 16z to the unloading position E1. In this path 32, the chain passes over a driving wheel 33 and over deviating rollers 53.

Similarly, there is provided an additional path or track 34 along which the containers are moved from the unloading position E2 to the intermediate position 16z and vice versa. The chain moving along this path passes over driving wheel 35. In the neighborhood of the intermediate position, namely from the deviating wheel 36 on, the path 34 merges with the path 32. At 38, a transfer from the chain path 28 and guiding means 39 to one of the paths 32 and 34 is possible and vice versa.

FIGS. 6a to 6d show in greater detail that roller chain which serves for transporting the containers on the paths 32 and 34 and also show the guiding of the chain and the followers thereon. The link chain is provided with rollers 40. The inner links are designated with the reference numeral 41 and the outer links are designated with the reference numeral 42. Steel bands 43 which serve for guiding the chain are held on the container or housing wall 45 by angle irons 44. This wall 45 is shown in FIGS. 6b—6d, 7b—7c and is outlined in FIG. 4. At the end of the chain there is provided a U-shaped follower 46 which engages the bolt 27. A chain 28 as illustrated for instance in FIG. 4 is shown in FIGS. 7a to 7c. Also these chains have rollers 40, inner links 41 and outer links 42. The guiding of the chain and of the bolts 27 pulled or pushed by said chain is effected by rails 47 which by means of supports 48 are in spaced relationship to each other connected to the container or housing wall 45. The chain has followers 29 which have the shape of an F and are carried by the chain by means of an extension 50 which takes the place of outer links. The intermediate section 51 of this chain rests on a plurality of inner and outer links 41 and 42 of the succeeding chain portion. By means of jaws 52, the follower extends around the bolts 27. The reference numeral 49 indicates a lining member located on the container wall 45 and additionally guiding bolts 27.

FIG. 4 also indicates how the container 16 the bolts of which are guided by the follower 49a is moved toward the right by half the container length and furthermore illustrates the location of the cashier at a point where approximately the left half of the container 16Bel is located. By actuating the drive 30 according to which the follower 49a moves toward the left, the cashier is able gradually to move the entire bottom of the container to a position which is most easily accessible to her. At the end of the loading operation, the container occupies a position in which it is precisely over the intermediate position 16z.

The movement of the containers is so effected that the container moves from the last-mentioned position by actuation of the drive 30 first into the position 16y. Thereupon, the container is moved either from position E1 or E2 through the path 32, 34 to the transfer position 38 so that the empty container occupies the intermediate position 16z. The container then moves onto the path described by the chain 28. By actuation of the drive 30, the container is lifted to the loading position. Simultaneously, the loaded container moves from position 16y to the position 16z. By actuation of one of the drives 33 or 35, the filled container is moved from here to the unloading station E1 or the unloading station E2 where the customer is able to withdraw the goods from the container and to pack the goods.

It is, of course, to be understood that the present invention is, by no means limited to the particular constructions shown in the drawings but also comprises any modifications within the scope of the invention.

I claim:

1. An installation for self-service stores, according to which the goods purchased by a customer are moved by the latter to a cashier, checked off by the latter, and packed by the customer, which includes: a cashier station, at least three containers each being adapted to receive goods purchased by a customer, a loading station adjacent said cashier station and within the manual reach of a cashier at said cashier station and adapted to receive any one of said containers loaded by a cashier at said cashier station with the goods purchased by a customer and checked off by said cashier, at least one unloading station for receiving a container loaded by a cashier at said loading station for withdrawing of said goods and for packing the same by a customer, and conveying means leading from said loading station to said unloading station and vice versa and including a substantially vertically extending section, said conveying means for said containers permitting stepwise movement of said container at said loading station in the longitudinal direction of said container and along a substantially horizontal plane to thereby facilitate the loading of said container by the cashier.

2. An installation for self-service stores, according to which the goods purchased by a customer are moved by the latter to a cashier, checked off by the latter, and packed by the customer, which includes: a cashier station, at least three containers each being adapted to receive goods purchased by a customer, a loading station adjacent said cashier station and within the manual reach of a cashier at said cashier station and adapted to receive any one of said containers loaded by a cashier at said cashier station with the goods purchased by a customer and checked off by said cashier, at least one unloading station for receiving a container loaded by a cashier at said loading station for withdrawing said goods and for packing the same by a customer, and conveying means leading from said loading station to said unloading station and vice versa and including a substantially vertically extending section, a depositing plate adjacent said loading station and in which said loading station is so arranged with regard to said depositing plate that a container at said loading station which is to receive goods from said depositing plate has its bottom located at a level lower than said depositing plate has its bottom located at a level lower than said depositing plate and has its upper edge located at a level higher than said depositing plate, the front wall of said container facing said depositing plate being adjustable as to height, and said container adjacent said depositing plate being movable in the direction toward and away from said depositing plate.

3. An installation according to claim 1, which in addition to at least one loading and at least one unloading station also comprises at least one adjoining readiness station for holding a container in readiness for direct movement to the loading station.

4. An installation according to claim 1, in which said conveying means include track means for shift of container positioning.

5. An installation according to claim 2, in which the shifting movement described by the center of gravity of each of said containers during the conveying means displacement thereof is effected along a vertical plane.

6. An installation according to claim 1, in which rectilinear projection of the adjoining loading and unloading stations has approximately the shape of an elongated rectangle substantially in conformity with the shape of said containers.

7. An installation according to claim 4, in which said track means include inclined track sections to take advantage of gravity while braked sufficiently for preventing undue acceleration.

8. An installation according to claim 2, in which said loading unloading stations collectively are so arranged that the container particularly in said loading station is located lower than the container in readiness from said unloading station so that the container in said loading station can be loaded by the cashier while sitting down and the container in the unloading station can be unloaded by the customer while standing up.

9. An installation according to claim 2, which comprises a plurality of cashier units, each cashier unit including: two cashier seating-support stations, two loading and unloading stations each comprising containers for receiving the goods, and tracks for transporting said containers, the arrangement collectively joined being such that two loading and unloading stations are directly adjacent to each other and parallel to each other directed in the same direction of flow of the goods, whereas the two cashier stations are arranged on the outside of said loading and unloading stations parallel thereto but with oppositely directed view for the cashier, each two adjacent cashier units defining a passage therebetween for the customers.

10. An installation according to claim 2, which comprises a plurality of cashier units, each cashier unit including: two cashier seating-support stations, two loading and unloading stations each comprising containers for receiving the goods, and tracks for transporting said containers, the arrangement collectively joined being such that the two cashier units with oppositely directed view for the cashier are located directly adjacent to each other and that toward the outside of the cashier units and parallel thereto there are respectively arranged said loading and unloading stations, the said loading and unloading stations being directed in the same direction of movement of the goods, each two adjacent units defining therebetween a passage for the customers.

11. An installation according to claim 2, which comprises cashier units each including two cashier stations, two loading and unloading stations each comprising respective containers for receiving the goods, and tracks for transporting said containers, the arrangement collectively joined being such that the two cashier stations are arranged one behind the other with the view of the cashiers in the same direction but transverse to the movement of the customers, the two loading and unloading stations being arranged directly adjacent to the respective cashier station in the direction of movement of the customers and to the left side of the cashier in the respective unit, one cashier station and one loading and unloading station being arranged on each of opposite sides of the plane of symmetry of the respective unit.

12. An installation according to claim 2, which comprises cashier units each including two cashier seating-support stations, two loading and unloading stations each comprising containers for receiving the goods, and tracks for transporting said containers, the arrangement collectively joined being such that the two cashier stations are arranged one behind the other with the view of the cashiers in the same direction but transverse to the direction of movement of the customers, the two loading and unloading stations being arranged on the left-hand side of the cashiers while being spaced from each other so as to define therebetween an access space for the customers for unloading the goods from said unloading stations, each two adjacent cashier units defining therebetween a passage for the customers.

13. An installation according to claim 2, in which each of said containers symmetrically to the longitudinal central vertical plane thereof carries a pair of bolts, and which includes flexible push and pull means carrying followers for direct cooperation with said bolts of said containers.

14. An installation according to claim 13, in which said flexible push and pull means are formed by roller chains in fixed paths, and which includes gear means at least one of which is power-driven for driving said roller chains.

15. An installation for self-service stores according to which the goods purchased by a customer are moved by the latter to a cashier, checked off by the latter, and packed by the customer, which includes: a cashier station, at least three containers each being adapted to receive goods purchased by a customer, a loading station adjacent said cashier station and within the manual reach of a cashier at said cashier station and adapted to receive any one of said containers loaded by a cashier at said cashier station with the goods purchased by a customer and checked off by said cashier, at least one unloading station for receiving a container loaded by a cashier at a loading station for withdrawing of said goods and for packing the same by a customer, and conveying means leading from said loading station to said unloading station and vice versa and including a substantially vertically extending section, each of said containers symmetrically to the longitudinal central plane thereof carrying a pair of bolts, flexible push and pull means carrying followers for cooperation with said bolts, said push and pull means being formed by roller chains, gear means at least one of which is power driven for driving said chains, said push means being formed by flat spring means.

16. An installation according to claim 15, in which the drive of said chains is effected through the intervention of a pinion and a rack in mesh with said pinion, said rack being formed by a portion of said flat spring means.

17. An installation according to claim 15, in which said flat spring means has a perforation extending over its entire length and in engagement with a power-driven pinion.

18. An installation according to claim 1, in which one housing encloses at least said roller chains for container positioning.